United States Patent
Thompson

(10) Patent No.: US 9,010,598 B2
(45) Date of Patent: Apr. 21, 2015

(54) MOTORCYCLE STABILITY SYSTEM

(71) Applicant: Triumph Designs Limited, Leicestershire (GB)

(72) Inventor: Ben Thompson, Warwickshire (GB)

(73) Assignee: Triumph Designs Limited, Leicestershire (GB)

( * ) Notice: Subject to any disclaimer, the term of this patent is extended or adjusted under 35 U.S.C. 154(b) by 253 days.

(21) Appl. No.: 13/633,318

(22) Filed: Oct. 2, 2012

(65) Prior Publication Data

US 2014/0091120 A1 Apr. 3, 2014

(51) Int. Cl.
*B62J 9/00* (2006.01)

(52) U.S. Cl.
CPC ... *B62J 9/00* (2013.01); *B62J 9/001* (2013.01)

(58) Field of Classification Search
CPC .............. B62J 9/00; B62J 9/001; B62J 9/006; B62J 7/04
USPC ......... 224/413, 429, 430, 431, 433, 435, 447, 224/924; 180/219
See application file for complete search history.

(56) References Cited

U.S. PATENT DOCUMENTS

| | | | | |
|---|---|---|---|---|
| 1,102,159 A * | 6/1914 | Marrs | | 224/429 |
| 2,109,315 A * | 2/1938 | Harley | | 224/413 |
| 4,163,513 A * | 8/1979 | Kramer | | 224/413 |
| 4,244,496 A * | 1/1981 | Litz | | 224/413 |
| 6,234,266 B1 * | 5/2001 | Saiki | | 180/219 |
| 6,520,275 B2 * | 2/2003 | Galbraith et al. | | 180/219 |
| 7,311,232 B2 * | 12/2007 | Watanabe et al. | | 224/413 |
| 8,152,036 B2 * | 4/2012 | Visenzi | | 224/413 |
| 2004/0232183 A1 * | 11/2004 | Watanabe et al. | | 224/413 |
| 2006/0163302 A1 * | 7/2006 | Knoch et al. | | 224/413 |
| 2006/0261110 A1 * | 11/2006 | Aron | | 224/413 |

* cited by examiner

*Primary Examiner* — Brian D Nash
*Assistant Examiner* — Corey Skurdal
(74) *Attorney, Agent, or Firm* — Levenfeld Pearlstein, LLC

(57) ABSTRACT

A motorcycle stability system and a motorbike having the stability system. The system includes at least one pair of pannier pivot mounts each configured for attachment to an opposite side of the motorcycle. Each pannier pivot mount can have a pannier pivotally mounted thereon. A pair of pivot levers are each pivotally attached at an attachment point disposed on said pivot lever to an opposite side of the motorcycle. The pivot levers have a first end section having an abutment thereon and a connection point. The attachment point is separated from the abutment and the connection point. The abutment on the first end section of the pivot levers contacts the panniers at a position below the pannier pivot mounts. A force transfer mechanism is connected to the second end sections of the pivot levers so that movement of one of the pivot levers causes the force transfer mechanism to exert a force to the other pivot lever.

25 Claims, 8 Drawing Sheets

MOTORCYCLE STABILITY SYSTEM

BACKGROUND

Panniers are frequently attached to the rear of motorcycles for the storage and transport of goods, however at higher speeds it is common for the addition of panniers to affect the stability of a motorcycle. This instability manifests in a wobble which is experienced in the steering of the vehicle and feeds back to the rider via the handlebars and leads to steering instability.

Traditionally the instability caused by the addition of panniers is alleviated by changing the chassis geometry which generally gives a reduction in motorcycle agility as perceived by the rider.

Generally, adding mass behind the centre of gravity of a motorcycle increases a susceptibility to instability caused by energy input into the bike, for example by buffeting of the panniers which present a different cross section to a bike with no panniers, or for example from bumps in the road surface. In order to minimise the speed effect of panniers upon a motorcycles steering stability there has been a move by some manufacturers from very rigidly mounted panniers to panniers that are mounted with some flexibility within the pannier mounting system so that they are not too rigidly connected to the frame or panels of the bike. This allows them some pannier movement, which may assist in minimising the effect of any energy input on the stability of the bike.

SUMMARY

The present invention provides an improved system for the enhanced steering stability of motorcycles having panniers. The invention provides a pannier stability system which reduces the effect of pannier movement on the steering system of the motorcycle, thereby increasing the steering stability. The increase in steering stability provided generally enhances the overall performance of the motorcycle and in particular the driving sensation.

The present invention provides a system in which a pannier pivotally mounted to either side of a motorcycle can transfer movement, for example but not limited to, movement created by the buffeting of said pannier as a result of airflow thereover, via the motorcycle stability system to a pannier mounted on the opposite side of the motorcycle. The opposite pannier provides a dampening effect on the movement of the pannier which reduces any buffeting of the panniers being translated into the frame of the bike.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures and systems for carrying out the purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION

Figure 1:
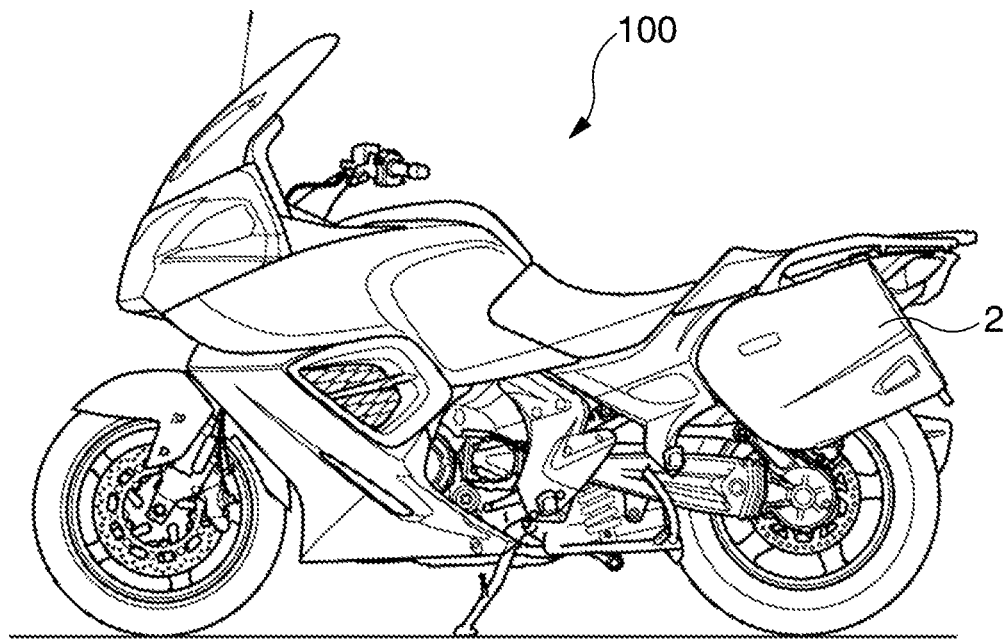
FIG. 1 shows a side view of a motorbike having a pannier system of the invention.
Figure 2:
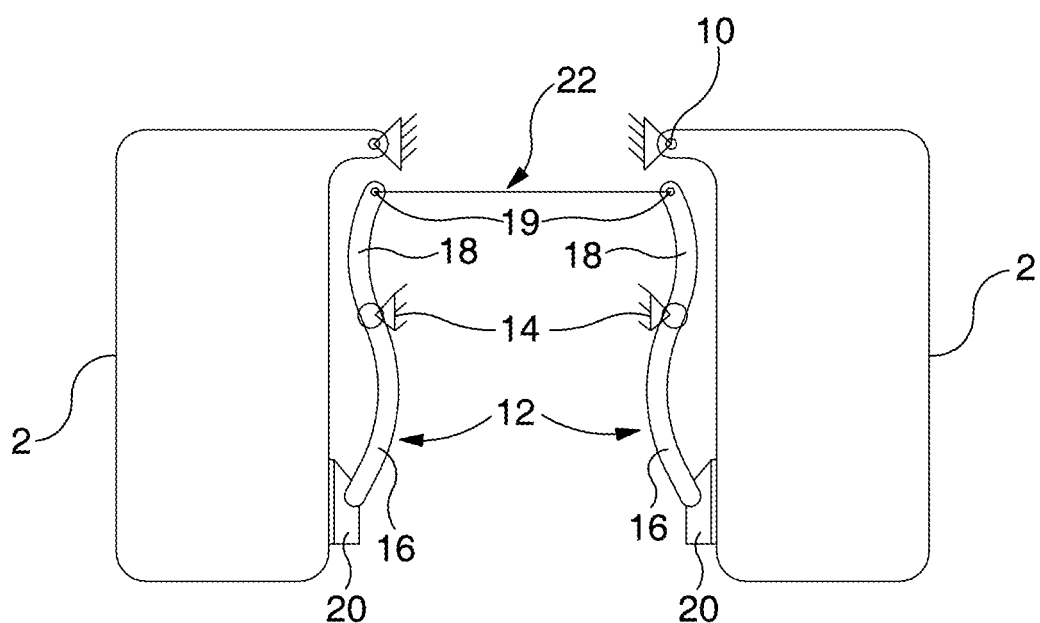
FIG. 2 shows a schematic illustration of a possible arrangement of the invention.

Referring to FIG. 1 a motorbike 100 is shown having a pannier 2 attached to either side thereof. FIG. 2 shows a cross section through the rear section of a motorcycle, for example as shown in FIG. 1, having a system according to an embodiment of the invention is shown. Some details of the motorcycle are omitted for clarity.

Figure 3:
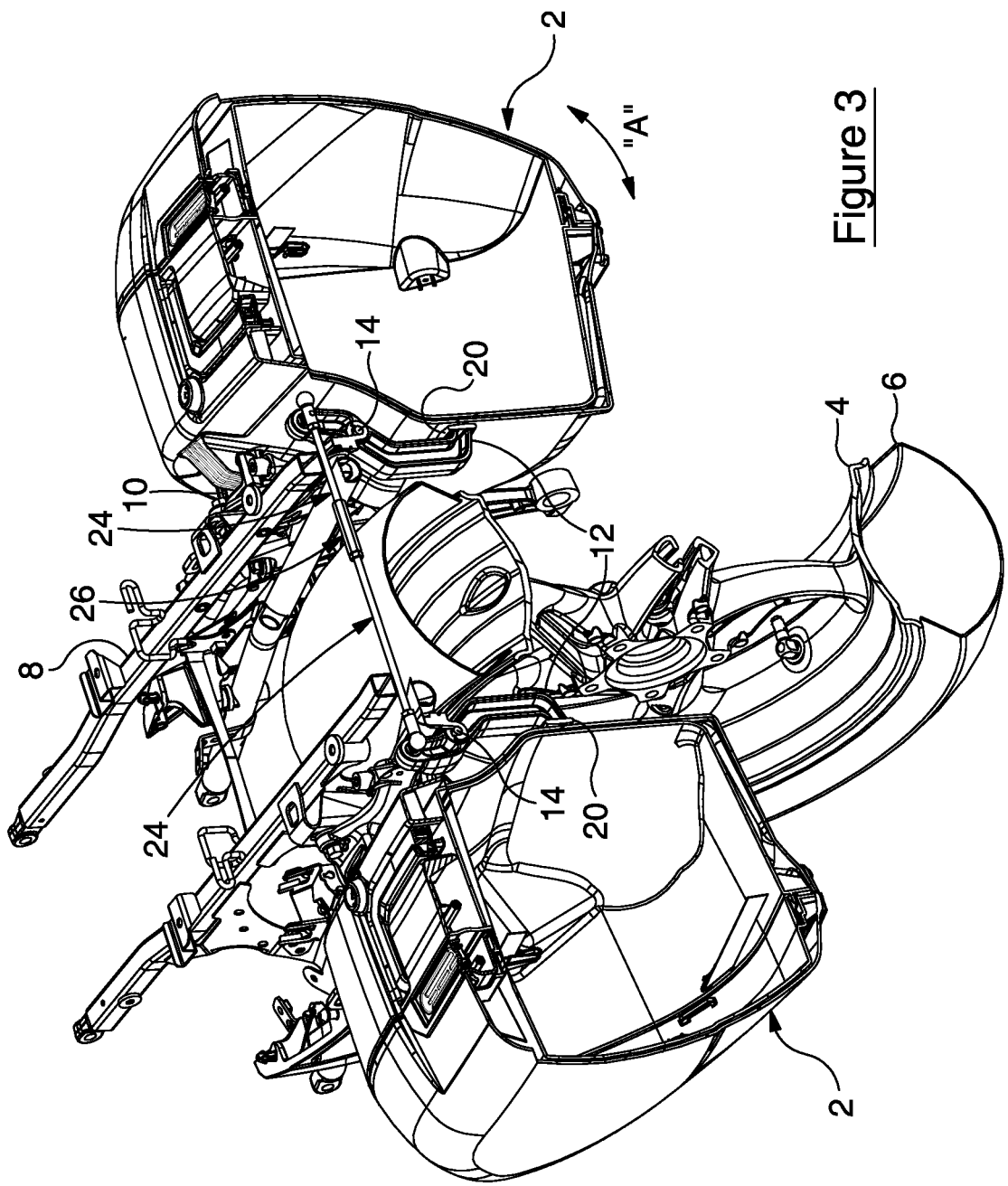
FIG. 3 shows a section through one embodiment of a system of the present invention on a motorcycle

Referring to FIGS. 2 and 3, a pair of panniers 2 are shown mounted so that they are positioned on either side of a rear wheel comprising a rim 4 and a tyre 6. Attached to the frame of the motorcycle 8 are two pairs of pannier pivot mounts 10 one of each mount pair attached to each side of the motorcycle. Although only one such mount is shown on each pannier in the drawing at the rear of the each pannier it will be appreciated that the other mount on each side attached to the front end of the pannier, in the section cut away in this section drawing. The panniers mount onto the pannier mounts so that they can pivot about each mount to move inwards or outwards as depicted by arrow "A".

Also attached to the frame 8 of the motorcycle is a pair of pivot levers 12. One pivot lever is attached to each side of the frame by an attachment point 14 about which point the pivot levers can pivot. The attachment point 14 is disposed between a first end section 16 of the pivot levers 12 and a second end section 18 of the pivot levers. Each first end section 16 of the pivot levers is provided with an abutment 20. The pivot levers 12 are attached to the frame in a position such that when the panniers are mounted on the pannier pivot mounts 10, the abutment 20 of each lever 12 bears on the internal side of each pannier facing inwardly toward the rear wheel of the motorcycle.

A force transfer mechanism 22 is attached to a connection point 19 the end of each second end section 18 of the pivot levers such that movement of one pivot lever causes a force to be exerted on the other pivot lever. In use the effect of this is that if one pannier moves against one of the pivot levers then the force transfer mechanism 22 causes a movement of the other pivot lever by means of exerting a force thereon which causes the other pivot lever to bear on the other pannier, causing an equal an opposite movement thereof.

As depicted in FIG. 2 the force transfer mechanism 22 may be a simple rod connecting the two pivot levers. The rod can comprise of two sections 24 connected together by an adjustable connector 26. In this way, after attachment of the panniers the rod length can be modified to ensure that the abutments 20 bear on the panniers.

The abutments 20 of the pivot levers 12 are located at a position below the pannier pivot mounts 10. In this manner, when the bike is in an upright position, gravity can maintain the panniers 2 in contact with the abutments 20.

Figure 4:
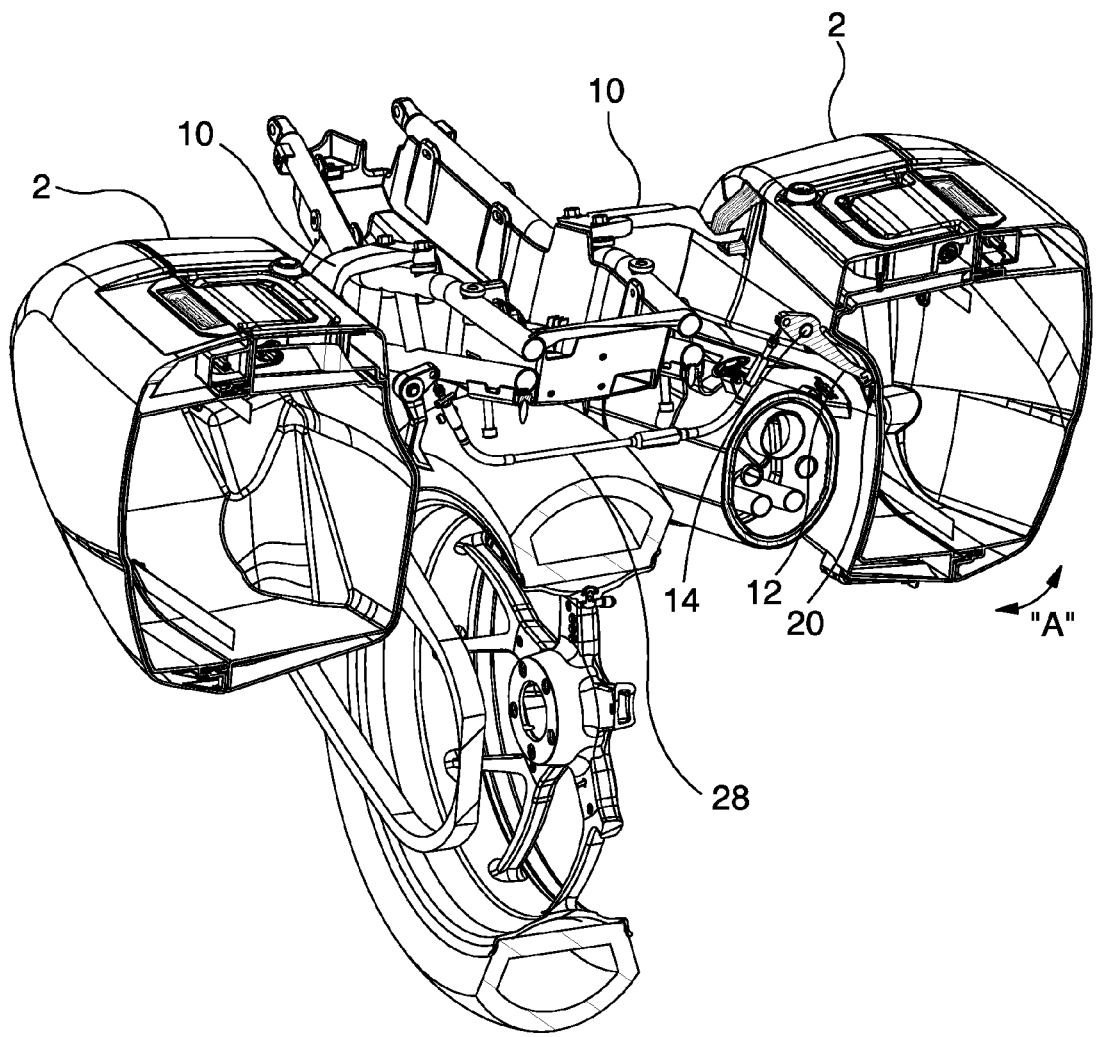
FIG. 4 shows a section through another embodiment of a system of the present invention on a motorcycle

Referring to FIGS. 2 and 4 an alternative embodiment of the invention is shown. In this embodiment the panniers 2 are mounted to pannier pivot mounts 10 so that they can pivot thereabout as depicted by arrow "A". A pivot lever 12 is attached to each side of the motorcycle by an attachment 14 that is disposed between a first end section of the pivot lever and a second end section of the pivot lever. The first end section of the pivot lever has an abutment 20 that bears against the on the internal side of each pannier facing inwardly toward the rear wheel of the motorcycle.

This embodiment differs from the embodiment depicted in FIG. 2 in that instead of the rod linking the second ends 18 of the pivot levers, in this case the force transfer mechanism comprises a cable linkage which is preferably a Bowden cable 28. The use of a Bowden cable as the force transfer mechanism 22 may be advantageous for smaller motorcycles wherein the space envelope for packaging the force transfer mechanism is reduced due to its flexibility. As shown in FIG. 4, a direct linkage in a straight line would not be possible on this motorcycle as part of the bodywork of the bike lies directly between the second ends of the two pivot levers 12. Using the cable, however, enables the force transfer mechanism to be routed around the obstruction.

Figure 5:
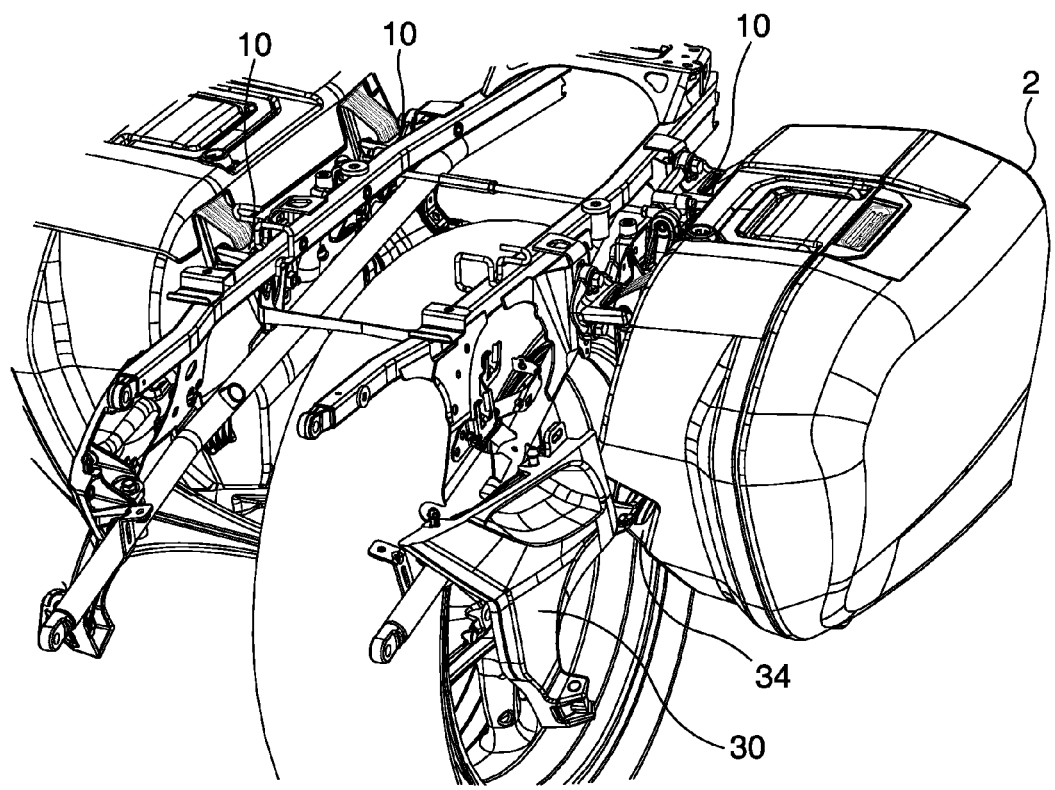
FIG. 5 shows a rear view of the arrangement of FIG. 2 showing a limit stop.
Figure 6:
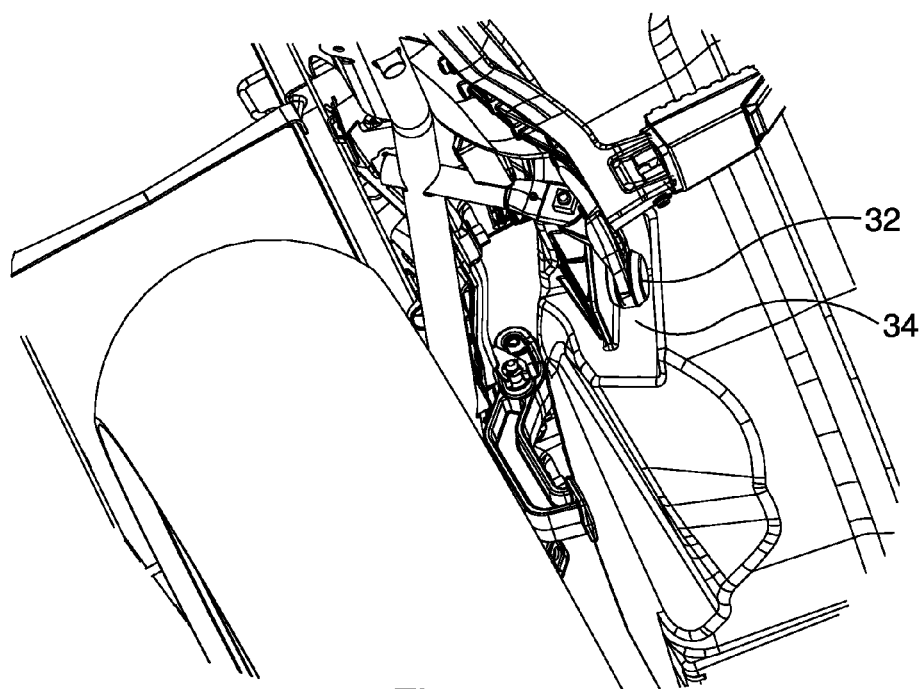
FIG. 6 shows a close up of the limit stop of FIG. 5.
Figure 7:
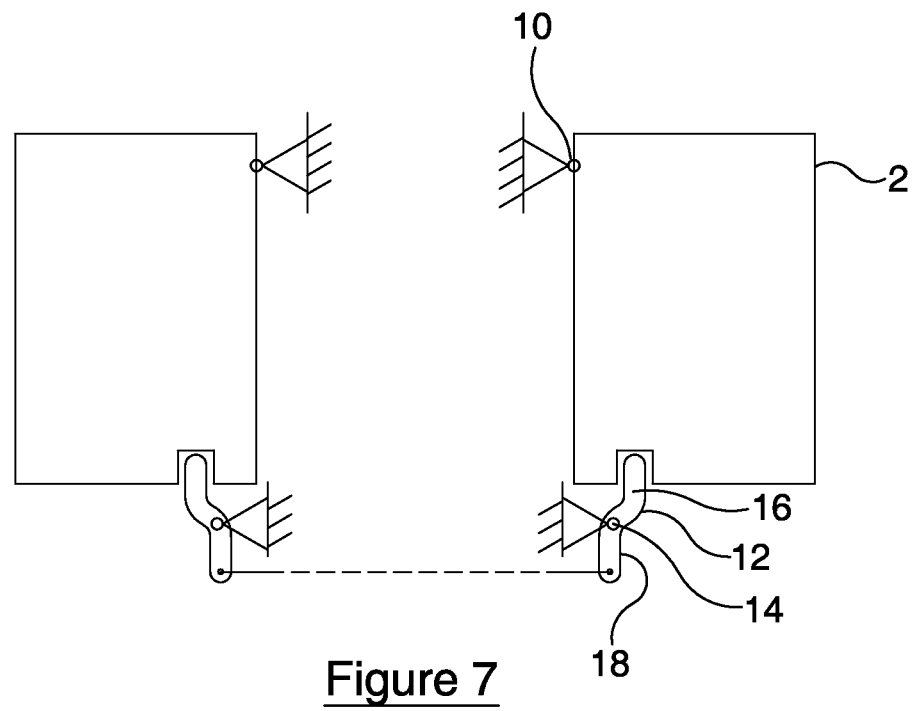
FIG. 7 shows a schematic illustration of another possible arrangement of the invention.
Figure 8:
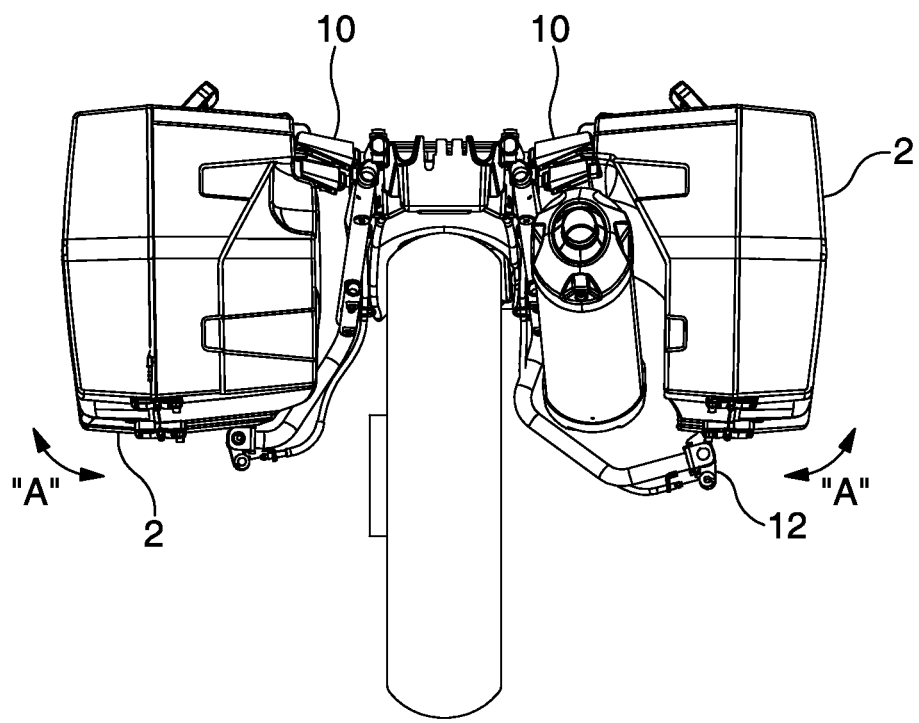
FIG. 8 shows a rear view of a bike having the arrangement of FIG. 7.
Figure 9:
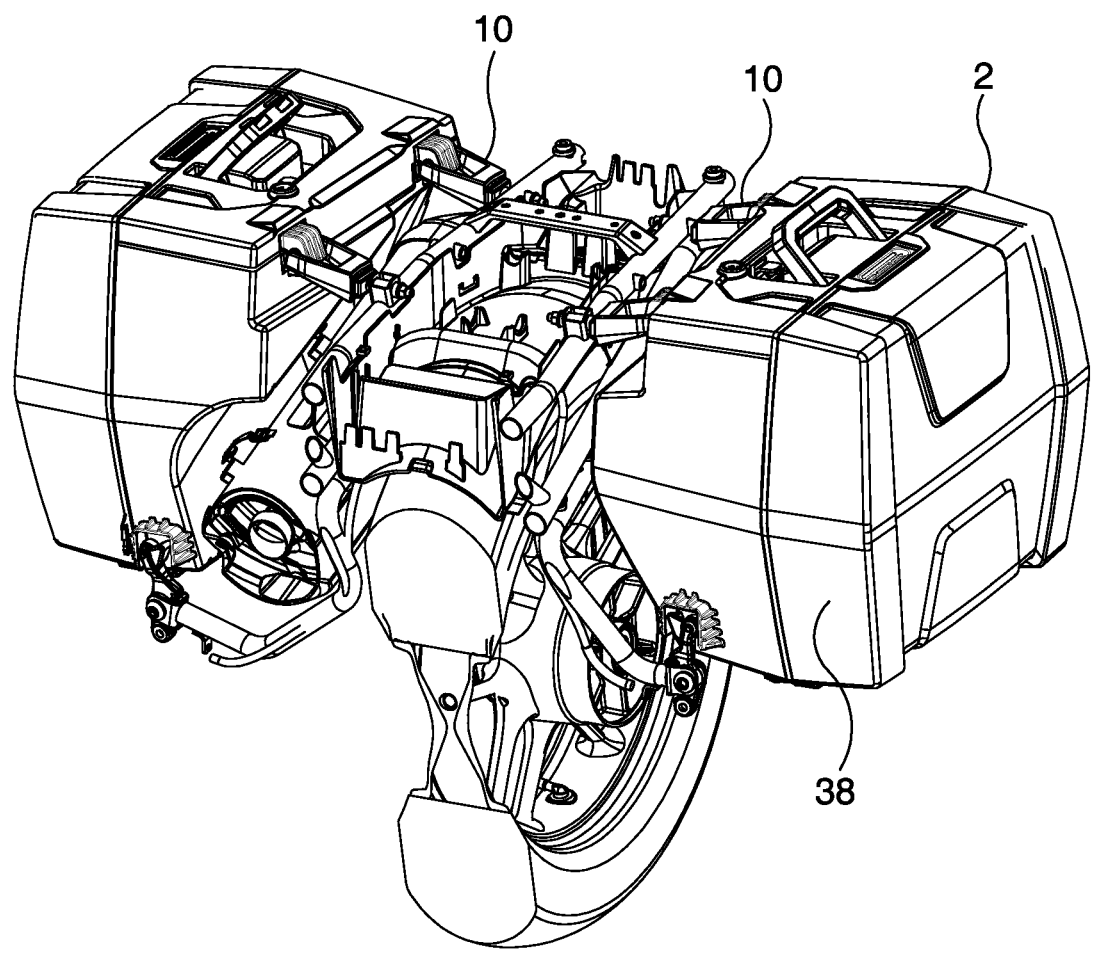
FIG. 9 shows a front view of the arrangement of FIG. 8.

Referring now to FIGS. 5 and 6, in order to limit the movement of the panniers about the pannier pivot mounts a limit stop mount 30 is attached to the frame on either side of the motorcycle. The limit stop mount has a limit stop 32 attached thereto which locates within a groove 34 within the pannier. The limit stop 32 is smaller than the groove 34 so that the pannier 2 may pivot about the pannier pivot mount 10 between the positions in which the pivot stop 32 abuts one side of the groove 34 and in which the pivot stop 32 abuts the other side of the groove 34. The limit stops 32 enable small movements of one pannier to be transferred into the other pannier while preventing excessive movement of the panniers 2. Although not shown it will be appreciated that a similar limit stop system can be utilised with the system shown in FIG. 4.

Referring to FIGS. 7 to 10 a yet further embodiment of the invention is shown. The principle of operation of this embodiment is identical to that of the embodiments described above. The panniers 2 are attached to the motorcycle by the pannier pivot mounts 10 so that the can pivot about them as depicted by arrow "A". In this embodiment however the pivot arms 12 are mounted to the motorcycle by an attachment 14 that is located below the panniers 2. As with the above examples the pivot arms 12 have a first end section 16 and a second end section 18 and the attachment 14 is disposed between the first end section 16 and the second end section 18. The first end section 16 has an abutment 20 which bears on the pannier 2. In this embodiment a U channel 36 is provided on a front face 38 of each pannier 2 and the abutment 20 locates in the U channel 36. As shown the abutment 20 also includes a rolling bearing 20A but it will be appreciated that this is not essential.

The end of the second end section 18 is attached to the force transfer mechanism 22 which is shown as a Bowden cable but which can also be a hydraulic or electromechanical link. During use pivotal movement of one pannier, for example as a result of air buffeting will cause the side surfaces of the U channel 36 to bear on the abutment 20 which will cause the pivot arm 12 to pivot about its attachment 14. This pivotal movement will cause the second end section 18 to exert a force on the opposite pivot mount through the force transfer mechanism 22, which in turn will cause the opposite pannier to move in the opposite direction. By "move in the opposite direction" what is meant is that a pivotal movement of one pannier towards the centre line of the motorcycle will cause the other pannier to pivot away from the centre of the centre line of the motorcycle.

Figure 10:
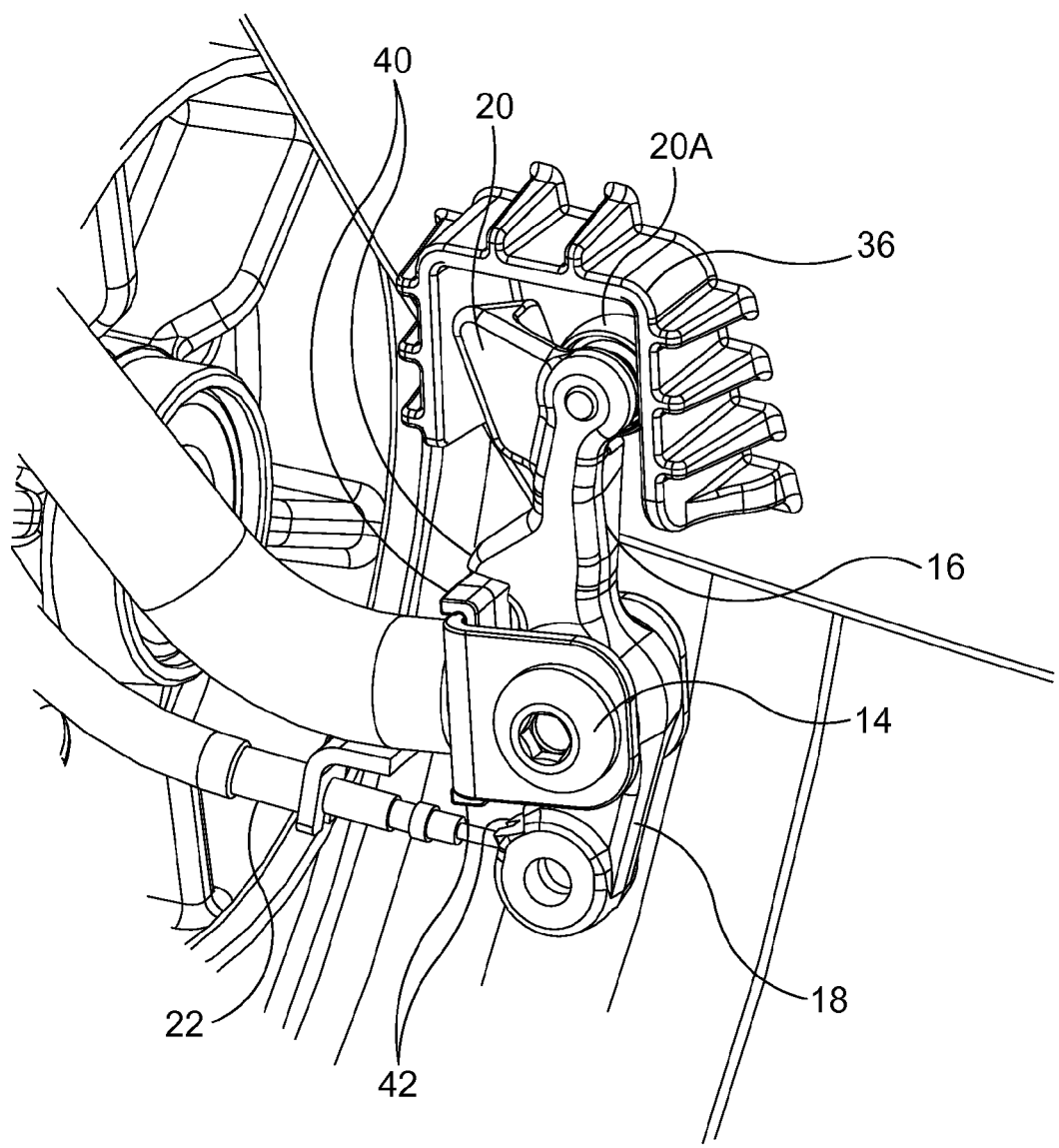
FIG. 10 shows an enlarged section of the pivot arm mechanism of FIG. 9.

In this embodiment an alternative limit stop arrangement is shown. As shown in FIG. 10 as movement in either direction causes a movement of the pivot lever 12, the maximum extend of the pivotal movement of the panniers 2 can be controlled by limit stops on the pivot lever itself. One limit stop 40, 42 is provided to limit the movement in each direction. It will, of course, be understood by the skilled person that alternatively the limit stops of FIGS. 5 and 6 could also be used with this pivot arm arrangement.

Figure 11:
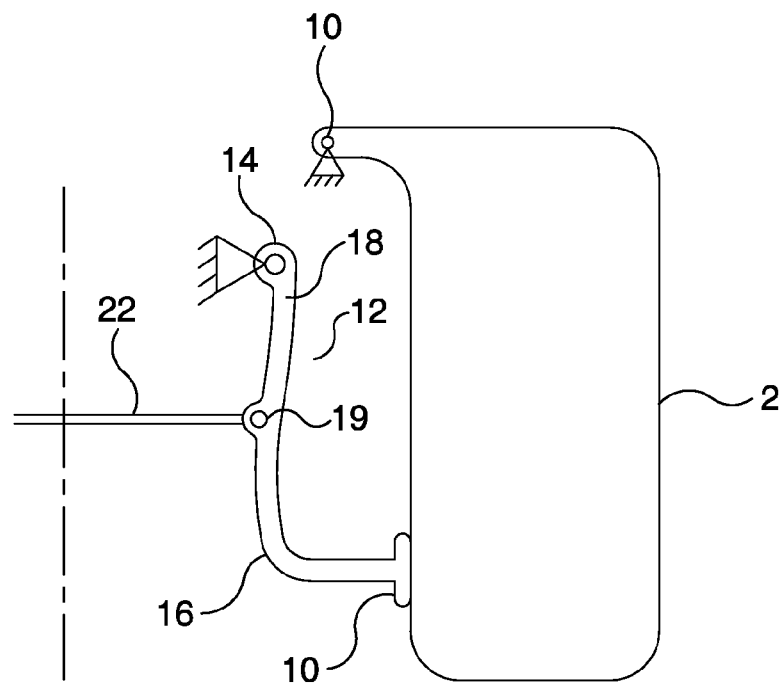
FIG. 11 shows an alternative arrangement of the invention.

Referring to FIG. 11 an embodiment is shown wherein a pannier 2 is pivotally mounted to a pannier pivot mount 10. A pivot lever 12 is attached to the bike at an attachment point 14 at one end thereof and has an abutment 20 at the opposite end thereof. Disposed between the first end section 16 of the pivot lever 12 and the second ends section 18 of the pivot lever 12 is an attachment point to which the force transfer mechanism 22 is attached. The different arrangement may be used where the packaging requirement of the arrangements described above are not suitable for a particular motorcycle layout.

Figure 12:
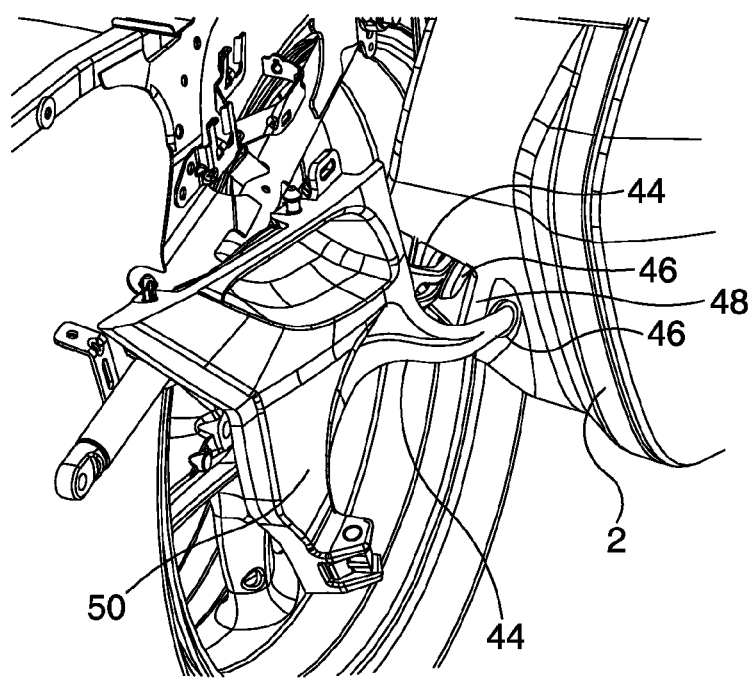
FIG. 12 shows an alternative arrangement of the limit stop.

Referring to FIG. 12 a similar of the limit stops to that shown in FIGS. 5 and 6 is shown. In the arrangement of FIG. 12, as can be seen the limit stop comprise two arms 44 each with a side abutment 46 thereon, and a boss 48 on the pannier 2 that locates between the two abutments 46. The separation of the abutments 46 is greater than the width of the boss 48 such that the pannier 2 can move between the abutments 46. The arms 44 to which the abutments 46 are attached are formed on a part 50 that is rigidly connected to the bike such that the abutments 46 act to limit the range of movement of the pannier 2.

In all the embodiments of the invention, instead of rigidly coupling the panniers to the motorcycle the use of the pivot mounts and the stability system of the invention allows small movements of the panniers, as may be caused by air buffeting at speed, to be decoupled from the bike which reduces wobble in the steering which can occur in rigidly attached pannier systems. The use of the pivot levers 12 to transfer the movement from one pannier to the other pannier inherently introduces a limited amount of friction into the system which has a partial dampening effect on the movement. Furthermore the use of the pivot levers enables the force transfer mechanism to be located in the most beneficial location for the overall compactness of the motorbike.

What is claimed is:

1. A motorcycle stability system comprising:
   at least one pair of pannier pivot mounts each configured for attachment to an opposite side of a motorcycle, and each said pannier pivot mount configured to pivotally mount a pannier thereon;

a pair of pivot levers each configured for pivotal attachment at an attachment point disposed on said pivot lever to an opposite side of a motorcycle, each said pivot lever having a first end section having an abutment thereon, and a connection point, said attachment point separated from said abutment and said connection point;

said abutment configured for contact with said pannier at a position below said pannier pivot mounts; and a force transfer mechanism connected to said connection points of each of said pivot levers whereby movement of one of said pivot levers causes said force transfer mechanism to exert a force to the other of said pivot levers, wherein pivotal movement of one of said pivot levers relative to a centerline of said motorcycle causes an opposite pivotal movement of said other of said pivot levers relative to said centerline of said motorcycle.

2. The motorcycle stability system of claim 1 wherein said force exerted by said force transfer mechanism on said other of said pivot levers causes said other pivot lever to move in the opposite direction relative to said centerline of said motorcycle.

3. The motorcycle stability system of claim 1 wherein each said pivot lever has a second end section having said connection point located thereon, and said attachment point is disposed between said first end section and said second end section.

4. The motorcycle stability system of claim 3 wherein the distance from the attachment point of the pivot lever to a distal end of the first end section is greater than the distance from the attachment point of the pivot lever to a distal end of the second end section.

5. The motorcycle stability system of claim 1 wherein each said pivot lever has a second end section having said attachment point located thereon, and said connection point is disposed between said first end section and said second end section.

6. The motorcycle stability system of claim 1 wherein said at least one pair of pannier pivot mounts comprises two pairs of pannier pivot mounts, one pannier pivot mount of each of said pairs configured for attachment to opposite sides of a motorcycle.

7. The motorcycle stability system of claim 1 wherein said abutment on said first end section of each said pivot lever is provided with an attachment for attaching said abutment to said pannier 8. The motorcycle stability system of claim 1 wherein said force transfer mechanism comprises one of: a link rod, Bowden cable, a hydraulic link, or an electromechanical link, connected at either end to said connection points of each of said pivot levers.

9. The motorcycle stability system of claim 1 wherein said force transfer mechanism comprises a link rod, said link rod having an adjuster for varying its length.

10. The motorcycle stability system of claim 1 further comprising a pair of panniers, each said pannier attached to a respective one of said pannier pivot mounts and having a limit stop to limit the pivotal movement of said panniers about said pannier pivot mounts.

11. The motorcycle stability system of claim 10 wherein the limit stop sits in a groove in each said pannier, said groove being wider than a width of the limit stop.

12. The motorcycle stability system of claim 10 wherein the limit stop comprises two side abutments positioned either side of a boss on the pannier, the separation of said side abutments being greater than the width of said boss.

13. The motorcycle stability system of claim 1 wherein each said pivot lever is positioned substantially below each said pannier and wherein said abutments are at up upward end of said pivot levers and sit in a recess in each said pannier 14. The motorcycle stability system of claim 13 wherein each said pivot lever has a limit stop to restrict the movement of said pivot lever in each rotational direction about said attachment.

15. A motorcycle having a motorcycle stability system comprising:

at least one pair of pannier pivot mounts each configured for attachment to an opposite side of said motorcycle, and each said pannier pivot mount configured to pivotally mount a pannier thereon;

a pair of pivot levers each configured for pivotal attachment at an attachment point disposed on said pivot lever to an opposite side of said motorcycle, each said pivot lever having a first end section having an abutment thereon, and a connection point, said attachment point separated from said abutment and said connection point;

said abutment of each said pivot lever configured for contact with said pannier at a position below said pannier pivot mounts; and a force transfer mechanism connected to said connection points of each of said pivot levers whereby movement of one of said pivot levers causes said force transfer mechanism to exert a force to the other of said pivot levers, wherein pivotal movement of one of said pivot levers relative to a centerline of said motorcycle causes an opposite pivotal movement of said other of said pivot levers relative to said centerline of said motorcycle.

16. The motorcycle stability system of claim 15 wherein said force exerted by said force transfer mechanism on said other of said pivot levers causes said other pivot lever to move in the opposite direction relative to said centerline of said motorcycle.

17. The motorcycle of claim 16 further comprising a pair of panniers attached to said pannier pivot mounts, each said pannier having an internal face adjacent the motorcycle, an external face spaced from said motorcycle and a lower face, extending between the internal face and the external face, forming a bottom of each said pannier, and wherein movement of one said pivot lever by one of said panniers causes said other pivot lever to move in the opposite direction to move said other pannier.

18. The motorcycle of claim 17 wherein said abutment of each said pivot lever is in contact with said internal face of each pannier at a position below said pivot mount.

19. The motorcycle of claim 15 wherein the stability system further comprises a pair of limit stops to limit the movement of said panniers about said pannier pivot mounts.

20. The motorcycle of claim 19 further comprising a pair of panniers mounted on said pannier pivot mounts, wherein each said limit stop is rigidly attached to said motorcycle and extends into a groove formed in said panniers, each said grove being wider than each said limit stop.

21. The motorcycle of claim 19 further comprising a pair of panniers mounted on said pannier pivot mounts, wherein each said limit stop is rigidly attached to said motorcycle and comprises two side abutments positioned either side of a boss on the pannier, the separation of said side abutments being greater than the width of said boss.

22. The motorcycle of claim 19 wherein the abutment of each said pivot lever is received within a channel within each said pannier such that it bears on two opposing sides of said channel and wherein said limit stops are provided on each said pivot lever so as to limit the rotational movement of each said pivot lever about its attachment.

23. The motorcycle of claim 15 wherein said force transfer mechanism comprises one of: a link rod pivotally attached to the connection point of each said pivot lever; a Bowden cable attached to the connection point of each said pivot lever; hydraulic link attached to the connection point of each said pivot lever; or an electromechanical link attached to the connection point of each said pivot lever.

24. The motorcycle of claim 15 wherein each said pivot lever has a second end section having said connection point located thereon, and said attachment point is disposed between said first end section and said second end section.

25. The motorcycle of claim 15 wherein each said pivot lever has a second end section having said attachment point located thereon, and said connection point is disposed between said first end section and said second end section.

* * * * *